United States Patent
Konigsberg (10) Patent No.: US 9,308,920 B2
(45) Date of Patent: Apr. 12, 2016

(54) SYSTEMS AND METHODS OF AUTOMATING DRIVER ACTIONS IN A VEHICLE

(71) Applicant: GM GLOBAL TECHNOLOGY OPERATIONS LLC, Detroit, MI (US)

(72) Inventor: Amir Konigsberg, Herzliya Pituach (IL)

(73) Assignee: GM Global Technology Operations LLC, Detroit, MI (US)

(*) Notice: Subject to any disclaimer, the term of this patent is extended or adjusted under 35 U.S.C. 154(b) by 124 days.

(21) Appl. No.: 14/172,986

(22) Filed: Feb. 5, 2014

(65) Prior Publication Data

US 2015/0217777 A1  Aug. 6, 2015

(51) Int. Cl.
*B60R 25/04* (2013.01)
*B60W 50/08* (2012.01)

(52) U.S. Cl.
CPC ............ *B60W 50/08* (2013.01); *B60W 2520/00* (2013.01); *B60W 2530/00* (2013.01); *B60W 2540/00* (2013.01); *B60W 2550/12* (2013.01)

(58) Field of Classification Search
CPC ........ B60R 25/04; B60R 25/31; B60W 50/08
USPC ................... 701/2, 36, 45; 340/441
See application file for complete search history.

(56) References Cited

U.S. PATENT DOCUMENTS

| | | | |
|---|---|---|---|
| 2005/0192730 A1* | 9/2005 | Churchill et al. | 701/45 |
| 2006/0036356 A1* | 2/2006 | Rasin et al. | 701/1 |
| 2009/0079555 A1* | 3/2009 | Aguirre De Carcer et al. | 340/441 |
| 2011/0046814 A1* | 2/2011 | Buffmire et al. | 701/2 |
| 2015/0025708 A1* | 1/2015 | Anderson | 701/2 |
| 2015/0112512 A1* | 4/2015 | Fan et al. | 701/2 |

OTHER PUBLICATIONS

Lexus Personalized Settings—Vehicles with Display Audio system, www.lexus.com/pdf/service/ES_LPS.pdf, 5 pp (Printed Feb. 3, 2014).
Lexus Personalized Settings—Vehicles with Navigation system, www.lexus.com/pdf/service/RX_with_nav_LPS.pdf, 4 pp (Printed Feb. 3, 2014).
About IFTTT, https://ifitt.com/, 1 p (Printed Feb. 3, 2014).

* cited by examiner

*Primary Examiner* — Tan Q Nguyen
(74) *Attorney, Agent, or Firm* — Parks Wood LLC; Mickki D. Murray, Esq.

(57) ABSTRACT

A vehicle automates a driver action by controlling vehicle systems according to a rule. The rule includes a trigger event and an automated action. Rules are created or added for use by a vehicle using applications including user-defined rule applications, automatic rule applications, and network applications.

20 Claims, 3 Drawing Sheets

Fig. 4

SYSTEMS AND METHODS OF AUTOMATING DRIVER ACTIONS IN A VEHICLE

TECHNICAL FIELD

The present disclosure relates generally to systems and methods of automating driver actions in a vehicle.

BACKGROUND

Vehicle customization is useful for purposes of safety, privacy, and convenience. However, customizing a vehicle according to driver preferences can be difficult. For example, creating a level of customization that is useful to a driver can be time consuming and, for some types of customization, not available for current vehicle systems.

SUMMARY

The present technology relates to systems and methods of automating driver actions in a vehicle. A vehicle automates a driver action by controlling vehicle systems according to a rule created by the driver. The rule includes a trigger event and an automated action which follows from it. Rules are created or added for use by a vehicle using applications including user-defined rule applications, automatic rule applications, and network applications.

Other aspects of the present technology will be in part apparent and in part pointed out hereinafter.

The figures are not necessarily to scale and some features may be exaggerated or minimized, such as to show details of particular components. In some instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

DETAILED DESCRIPTION

As required, detailed embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern.

While the present technology is described primarily herein in connection with automobiles, the technology is not limited to automobiles. The concepts can be used in a wide variety of applications, such as in connection with aircraft, marine craft, and other vehicles.

The present disclosure describes systems and methods for automating actions that a driver can take while in a vehicle. Actions that a driver can take while in a vehicle include manually controlling vehicle systems, manually controlling auxiliary devices (e.g., non-vehicle systems) that are configured to connect to the vehicle, and manually configuring vehicle settings (e.g., via an on-board computing device or auxiliary device) to cause an on-board computing device to control vehicle systems or auxiliary devices.

As described herein, the term "driver action" refers generally to manual control (by hand, voice, etc.) of a vehicle system or of an auxiliary device (e.g., non-vehicle system) that is configured to connect to a vehicle system. For example, manual control is a control input (e.g., a setting or a value) using a control mechanism (e.g., button, voice, switch, lever, knob, voice-activated system, touch-sensitive display) of a vehicle system.

The term "automated action" refers generally to automated control of a vehicle system or automated control of an auxiliary device, for example, by an on-board device according to computer-readable instructions. An automated action may be a control input using a command signal that is based on computer readable instructions.

Figure 1:
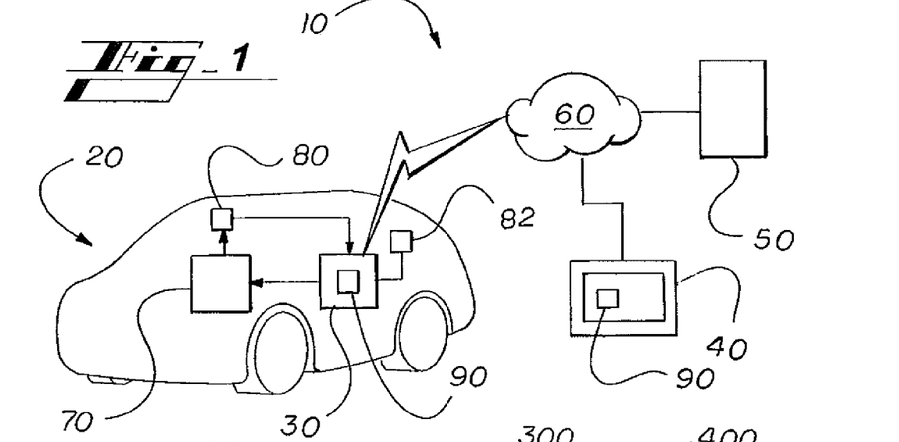
FIG. 1 illustrates schematically a computer network, according to an embodiment of the present disclosure.

According to an embodiment illustrated in FIG. 1, a computer network 10 (e.g., a mobile network) includes an on-board device 30 in a vehicle 20, an auxiliary device 40, and a remote server 50. The illustrated on-board device 30, the remote server 50, and the auxiliary device 40 are connected by a wireless data connection 60.

The auxiliary device 40 can include any of mobile devices (e.g., cellular phones, tablets), laptop computers, desktop computers, and other devices that are configured to access and display information (e.g., a webpage). For example, the auxiliary device 40 is configured to access the Internet over the wireless data connection 60.

The remote server 50 includes software and computer hardware that respond to requests by the on-board device 30 and the auxiliary device 40 (e.g., public users via the Internet) and provides a service to the on-board device 30 and the auxiliary device 40. The remote server 50 can be run on a dedicated computer or can include a plurality of networked computers.

The wireless data connection 60 is provided, for example, by radio transceivers in a mobile network or cellular network.

The vehicle 20 also includes vehicle systems 70 and sensors 80. Certain of the vehicle systems 70 include or are in communication with a control mechanism (e.g., a user interface 82, such as a knob, switch, voice-activated system, or touch-sensitive display) of the vehicle 20 that is accessible by a driver of the vehicle 20. Such vehicle systems 70 can be controlled by driver input actions.

The user interface 82 is connected to or at least in communication with (e.g., wirelessly or by wire) the on-board device 30 and is configured to display information to a user and receive input from a user. The on-board device 30 is configured to control the vehicle systems 70 and is configured to receive and analyze signals from the sensors 80, as described in further detail below.

For example, the vehicle systems 70 include heating systems, air conditioning systems, braking systems, acceleration systems, entertainment or infotainment systems (e.g., radio, video playing systems), navigation systems, mirrors (e.g., mirror adjustment systems), seats (e.g., seat adjustment systems), window control systems, doors (e.g., door lock control systems), collision-avoidance systems, traction control systems, a horn, windshield wiper systems, belts and hoses, emission system, engine, engine cooling system, exhaust system, lighting and wipers, starting, charging, and batteries, steering and suspension, transmission, sensors, switches, HVAC, cameras, communication devices (e.g., OnStar devices and other wireless communication devices), systems that connect to auxiliary devices (e.g., bluetooth devices, cellular phones), cluster, center stack, head up display (HUD), speech, gestures, sound, and the like.

The sensors 80 include, e.g., environmental sensors that measure data reflecting the environment associated with the vehicle 20 and vehicle system sensors that measure data that reflects the status or performance of the vehicle systems 70, control sensors that measure driver input actions applied using control mechanisms for the vehicle systems 70, and driver state sensors the measure driver state.

For example, environmental sensors include temperature sensors, traffic sensors, road type (e.g., highway, urban) sensors, weather (e.g., rain) sensors, occupancy sensors, and the like. For example, vehicle sensors include gas tank level, speed sensors, sensors associated with the vehicle systems 70 described above, and the like.

Figure 2:
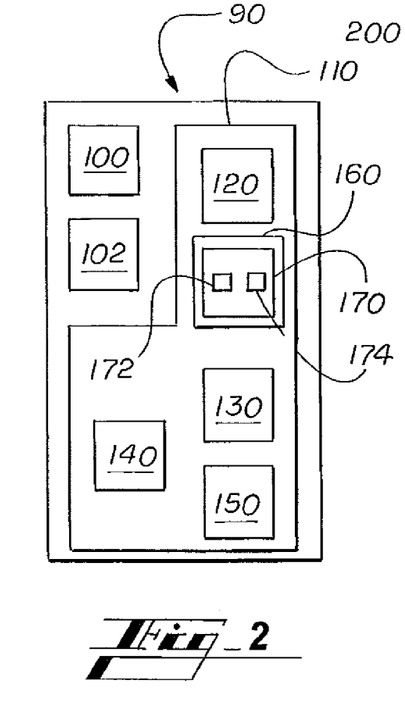
FIG. 2 illustrates a computing device, according to an embodiment of the present disclosure.

Referring to FIG. 2, each of the on-board device 30 and the auxiliary device 40 includes a computing device 90. The computing device 90 includes a processor 100 for controlling and/or processing data, input/output data ports 102, and a memory 110. While the computing devices are referenced by the same numeral (90) in the figures, and include the same primary features mentioned, they are not in every embodiment identical and so may differ in one or more ways.

The processor could be multiple processors, which could include distributed processors or parallel processors in a single machine or multiple machines. The processor could include virtual processor(s). The processor could include a state machine, application specific integrated circuit (ASIC), programmable gate array (PGA) including a Field PGA, or state machine. When a processor executes instructions to perform "operations," this could include the processor performing the operations directly and/or facilitating, directing, or cooperating with another device or component to perform the operations.

The computing device 90 can include a variety of computer-readable media, including volatile media, non-volatile media, removable media, and non-removable media. The term "computer-readable media" and variants thereof, as used in the specification and claims, includes storage media. Storage media includes volatile and/or non-volatile, removable and/or non-removable media, such as, for example, RAM, ROM, EEPROM, flash memory or other memory technology, CDROM, DVD, or other optical disk storage, magnetic tape, magnetic disk storage, or other magnetic storage devices or any other medium that is configured to be used to store information that can be accessed by the computing device 90.

While the memory 110 is illustrated as residing proximate the processor 100, it should be understood that at least a portion of the memory can be a remotely accessed storage system, for example, a server on a communication network (e.g. remote server 50), a remote hard disk drive, a removable storage medium, combinations thereof, and the like. Thus, any of the data, applications, and/or software described below can be stored within the memory and/or accessed via network connections to other data processing systems (not shown) that may include a local area network (LAN), a metropolitan area network (MAN), or a wide area network (WAN), for example.

The memory 110 includes several categories of software and data used in the computing device 90, including, applications 120, a database 130, an operating system 140, and input/output device drivers 150.

As will be appreciated by those skilled in the art, the operating system 140 may be any operating system for use with a data processing system. The input/output device drivers 150 may include various routines accessed through the operating system 140 by the applications to communicate with devices, and certain memory components. The applications 120 can be stored in the memory 110 and/or in a firmware (not shown) as executable instructions, and can be executed by the processor 100.

The applications 120 include various programs that, when executed by the processor 100, implement the various features of the computing device 90, including user-defined rule-creation applications, automatic rule-creation applications, control applications, and network applications, each of which is described in further detail below. The applications 120 are stored in the memory 110 and are configured to be executed by the processor 100.

The applications 120 may be applied to data stored in the database 130, such as that of signals received by the sensors 80 or the user interface 82, e.g., received via the input/output data ports 102 along with data received over the wireless data connection 60. The database 130 represents the static and dynamic data used by the applications 120, the operating system 140, the input/output device drivers 150 and other software programs that may reside in the memory 110.

A profile 160 for a user account is associated with the vehicle 20 and includes a rule 170, which includes an automated action 172 and a trigger event 174, described in further detail below. The profile 160 can include a plurality of rules 170 and each rule 170 can include one or a plurality of automated actions 172 and one or a plurality of trigger events 174. For simplicity, a single rule 170 is described below and the rule 170 includes a single automated action 172 linked to a single trigger event 174.

Where a rule 170 includes a plurality of trigger events 174, trigger events 174 can be related by conjunction ("and") and disjunction ("or"). For example, if two trigger events 174 are related by disjunction, a signal that includes data defined by either trigger event 174 will initiate the automated actions 172 of the rule 170. Alternatively, if two trigger events 174 are related by conjunction, both trigger events 174 must be present (e.g., in the same or different signals) to initiate the automated actions 172 of the rule 170.

The profile 160 is in some embodiments associated with the vehicle 20 and, generally, a single driver. For example, the rule 170 is particular to the vehicle 20 and is stored for use by the vehicle 20. For example, the profile 160 can be stored in the memory 110 or in the database 130 and is accessible by the processor 100. Alternatively or in addition, the profile 160 is stored on the remote server 50. In a contemplated embodiment, relevant features of a profile can be downloaded from an auxiliary device 40 and/or remote server 50 to another vehicle to be used by the driver, such as a rental car.

The profile 160 can be created, for example, using the user interface 82, through a web application (e.g., web page) using the auxiliary device 40, or through a user interface that is accessed through the auxiliary device 40. For example, a master copy of the profile 160 is stored on the remote server 50 and is accessible and editable using the user interface 82 or the auxiliary device 40. For robustness, the on-board device 30 can store a copy of the profile 160 in the memory 110 or in the database 130. More generally, the profile 160 can be created, accessed, edited, and copied by any device that provides an Internet connection.

It should be understood that FIG. 2 and the description above are intended to provide a brief, general description of a suitable environment in which the various aspects of some embodiments of the present disclosure can be implemented. The terminology "computer-readable media", "computer-readable storage device", and variants thereof, as used in the specification and claims, can include storage media. Storage media can include volatile and/or non-volatile, removable and/or non-removable media, such as, for example, RAM, ROM, EEPROM, flash memory or other memory technology, CDROM, DVD, or other optical disk storage, magnetic tape, magnetic disk storage, or other magnetic storage devices or any other medium, excluding propagating signals, that can be used to store information that can be accessed by the device shown in FIG. 2.

While the description refers to computer-readable instructions, embodiments of the present disclosure also can be implemented in combination with other program modules and/or as a combination of hardware and software in addition to, or instead of, computer readable instructions.

While the description includes a general context of computer-executable instructions, the present disclosure can also be implemented in combination with other program modules and/or as a combination of hardware and software. The term "application," or variants thereof, is used expansively herein to include routines, program modules, programs, components, data structures, algorithms, and the like. Applications can be implemented on various system configurations, including single-processor or multiprocessor systems, minicomputers, mainframe computers, personal computers, handheld computing devices, microprocessor-based, programmable consumer electronics, combinations thereof, and the like.

Figures 3, 5, 6:
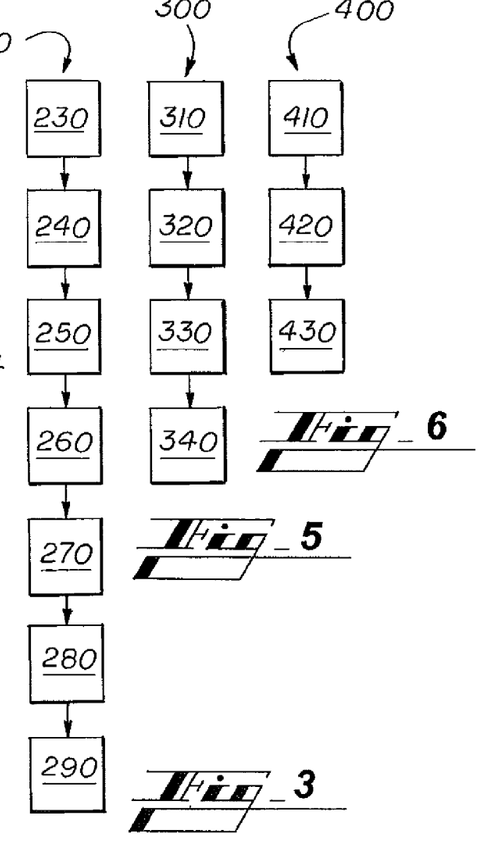
FIG. 3 illustrates a method of creating a user-defined rule, according to an embodiment of the present disclosure.
FIG. 5 illustrates a method of controlling vehicle systems, according to an embodiment of the present disclosure.
FIG. 6 illustrates a method of automatically creating a rule, according to an embodiment of the present disclosure.

FIG. 3 shows a user-defined rule-creation method 200 according to an embodiment of the present disclosure. A user-defined rule-creation application 120 includes computer-executable instructions that, when executed by the processor 100, cause the processor 100 to perform the user-defined rule-creation method 200.

It should be understood that the steps of methods are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims.

It should also be understood that the illustrated methods can be ended at any time. In certain embodiments, some or all steps of this process, and/or substantially equivalent steps are performed by execution of computer-readable instructions stored or included on a computer readable medium, such as the memory 110 of the computing device 90 described above, for example.

According to the user-defined rule-creation method 200, a user searches for and selects an action icon (e.g., which represents the automated action 172) and a trigger icon (e.g., which represents the trigger event 174) to create a rule icon (e.g., which represents the rule 170). To facilitate searching for action icons and trigger icons, the action icons and trigger icons are in some implementations grouped together in any of a variety of ways; for example, by vehicle system, sensor, function, relevance, similarity, other categories, alphabetically, combinations thereof, and the like.

Automated actions that are "relevant" are, for example, those that are predicted to be desirable to a specific user. Such predicted automated actions may be based on learning by the on-board device 30, for example, through historical driver actions. "Similarity" can be based on commonality between automated actions. "Similarity" can also be based on commonality between users that are interested in similar kinds of automated actions. For example, if user A has automated actions x, y, z in common with user B, and A also has automated action P, then B may also want to have automated action P.

The automated actions and trigger events can be grouped in multiple layers. For example, automated actions are grouped into narrower subgroups that are grouped into broader groups.

As a scenario for purposes of teaching, action icons are placed in one of a plurality subgroups, each subgroup being associated with a vehicle system, and the subgroups are placed into one of a plurality of groups, each group being associated with a general function category. A user can search for an action icon by selecting a general function category, then selecting a vehicle system within the selected general function category, and then selecting an action icon of the selected vehicle system.

For purposes of teaching, trigger icons are placed into one of a plurality of groups, including a vehicle group and an environmental group. A user searches for a trigger icon by selecting a vehicle group or an environmental group and then selecting a trigger icon of the selected group.

Selection elements such as drop-down menus and the like are used to facilitate selection of groups, subgroups, and action icons or trigger icons. Although the term "icon" is used for purposes of teaching, more generally, an indicator such as a name or icon or the like is used. The indicator represents each item (e.g., group, subgroup, automated action, trigger event).

Indicators that are similar may be used in order to facilitate understanding by a user. For example, where a sensor measures the performance of a vehicle system, a similar indicator (e.g., name, icon, etc.) may be used to indicate that a trigger event associated with the sensor for a vehicle system and an automated action associated with the vehicle system are in the same "domain."

Generally, the groups and subgroups for the action icons and the groups and subgroups of the trigger icons can be structured in a similar manner to make a search intuitive to a user.

Figure 4:
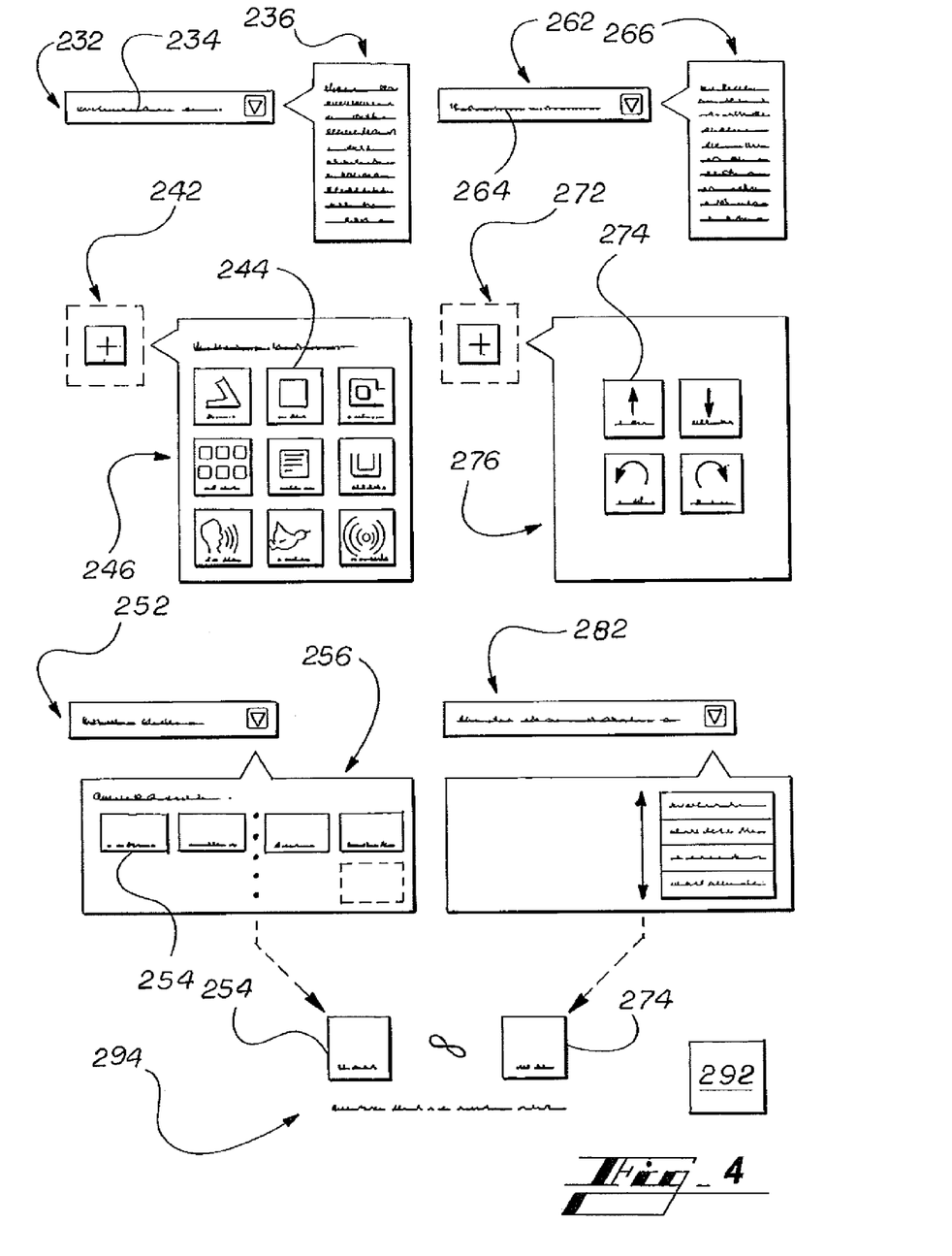
FIG. 4 illustrates a user-defined rule creation application that, when executed by a processor, causes the processor to perform the user-defined rule-creation method of FIG. 3.

Referring to FIGS. 3 and 4, at the block 230, the user-defined rule-creation application 120 displays (e.g., as a webpage on the auxiliary device 40 or on the user interface 82) a category-selection element 232 through which a user can select an action category label 234. For example, the category-selection element 232 includes a drop-down menu 236 that includes a list of the action category labels 234.

For example, the list of action category labels 234 includes social, communication, navigation, electric, heating ventilation air conditioning (HVAC), lightings, music, vehicle settings, under-the-hood systems (e.g., engine, transmission, power), and the like. These labels are broad categories of vehicle systems or applications that the driver can control with controls in the cabin of the vehicle 20 (e.g., the user interface 82 or the auxiliary device 40).

For example, communication includes phone, email, and text systems; navigation includes global positioning system (GPS) systems; electric includes power and charging systems; HVAC includes heating, fan, and air conditioning systems; lightings includes dash and overhead lighting systems; music includes radio, satellite radio, applications that stream music over the internet, auxiliary device music (e.g., applications and music libraries on smartphone) systems; and vehicle settings includes seat and mirror systems.

The user-defined rule-creation application 120 receives a selection of a category label 234 and, at the block 240, the user-defined rule-creation application 120 generates and displays a vehicle system selection element 242 through which a user can select a vehicle system icon 244. For example, the vehicle system selection element 242 includes a drop down menu 246 that includes a group of vehicle system icons 244. The group of vehicle system icons 244 is generated based on the selected category label 234.

For example, expanding on the description above, a group of vehicle system icons 244 that is generated based on the category label 234 of communication includes phone, email, text message, and the like.

The user-defined rule-creation application 120 receives a selection of a vehicle system icon 244 and, at the block 250, the user-defined rule-creation application 120 generates and displays an action-selection element 252 through which a user can select an action icon 254. For example, the action-selection element 252 includes a drop down menu 256 that includes a group of action icons 254. The group of action icons 254 is generated based on the selected vehicle system icon 244.

For example, a group of action icons 254 that is generated based on the vehicle system icon 244 of phone includes block phone calls, dial phone number of a contact, and the like. As an exemplary selection, the user selects block phone calls.

As mentioned above, driver actions include those that can be performed by a driver using controls in the cabin of the vehicle 20 or an auxiliary device 40. A more comprehensive list of example action icons 254 includes initiating a phone call, blocking phone calls or email or text messages, composing and sending an email or text message, initiating reading email or text messages, searching for directions to a location, setting the temperature of the cabin, defrosting back window, adjusting the lighting of the cabin, selecting a radio station, adjusting the volume of the radio, playing a podcast from a phone, adjusting mirror settings, adjusting seat settings, driving events (e.g., stopping for gas, excess speed, taking a side road), use of applications, checking email, and the like.

At the block 260, the user-defined rule-creation application 120 displays a category-selection element 262 through which a user can select a trigger category label 264. For example, the category-selection element 262 includes a drop-down menu 266 that includes a list of the trigger category labels 264. Exemplary trigger category labels 264 include vehicle and environment.

The user-defined rule-creation application 120 receives a selection of a trigger category label 264 and, at the block 270, the user-defined rule-creation application 120 generates and displays a trigger selection element 272 through which a user can select a trigger icon 274. For example, the trigger selection element 272 includes a drop-down menu 276 that includes a group of trigger icons 274. The group of trigger icons 274 is generated based on the selected trigger category label 264. Certain groups of trigger icons 274 are further based on selected action icons 254 or selected vehicle system icons 244.

Exemplary trigger icons 274 that are generated based on an action icon 254 of block phone calls and a trigger category label 264 of vehicle include speed, location, type of road, weather, and occupancy.

Trigger events are those which can be found in data measured by the sensors 80. As mentioned above, sensors 80 measure the environment within and outside of the vehicle 20, the status or performance of vehicle systems 70, inputs to a vehicle system 70 using a control mechanism (e.g., driver actions), and generally signals pertaining to driver state (e.g., the behavior and condition of the driver and passengers). Driver state may be directly measured a parameter may be measured and analyzes data to identify a driver state. Driver state (e.g., emotional state, cognitive state, etc.) includes behavior (e.g., irritation, distraction), physiology (e.g., cognitive overload, fatigue), and the like that the system can recognize through analysis of measurements of parameters including heart rate, driving time, steering behavior, galvanic skin response, Electroencephalography (EEG), driving behavior, speech detection, combinations thereof, and the like.

In addition, a more comprehensive list of trigger icons 274 includes ignition of the car, turning the car off, being within a distance of a location, a type of weather (e.g., rain), an outside temperature, a cabin temperature, a speed, occupancy of a seat in the cabin, weight of occupancy of a seat in the cabin (e.g., to identify occupancy and distinguish between a child and adult), who is in the cabin (e.g., as identified by the presence of auxiliary devices that are specific to a user), vehicle state (e.g., amount of gas in the tank, cabin temperature, amount of oil), driver state (e.g., how long the driver has been driving and how they are driving (e.g., erratically)), general conditions (e.g., weather, temperature, day, time), driving conditions (e.g., road type, traffic), and the like. For example, vehicle state triggers can be associated with a controller area network (CAN) bus.

The user-defined rule-creation application 120 receives a selection of a trigger icon 274 and, if the trigger icon 274 is configured to be further defined, at the block 280, the user-defined rule-creation application 120 generates and displays a trigger-defining element 282 through which a user can more specifically define the trigger icon 274. For example, if the trigger icon 274 is speed, the trigger-editing element 282 includes a drop-down menu 276 that includes a list of speeds. The user selects a speed from the drop-down menu 276 to set a speed value. For example, the user selects a speed of eighty-five kilometers per hour.

At the block 290, the user-defined rule-creation application 120 displays the action icon 254 and the trigger icon 274 along with a save element 292. The action icon 254 and the trigger icon 274 are a rule icon 294. By selecting the save element, the rule icon 294 is saved in the form of computer executable instructions as a rule 170. The action icon 254 is saved as an automated action 172 and the trigger icon 274 is saved as a trigger event 174. The rule 170 is saved to the profile 160.

Summarizing the example above, the example rule 170 includes an automated action 172 of blocking phone use and a trigger event 174 of speed greater than eighty-five kilometers per hour. Another example rule 170 includes an automated action 172 of selecting kids music (e.g., genre or folder) from a music library and a trigger event 174 of detecting kids are in the back seat (e.g., by weight sensors or detection of smartphones). Another example rule 170 includes an automated action 172 of setting a volume level and a trigger event 174 of car starting.

FIG. 5 shows a control method 300, according to an exemplary embodiment of the present disclosure. According to the control method 300, the on-board device 30 controls the vehicle systems 70 based on the rules 170. A control application 120 includes computer-readable instructions that, when executed by the processor 100, cause the processor 100 to perform the control method 300.

At a block 310, the processor 100 accesses the rule 170 from the memory 110.

At a block 320, the processor 100 receives and analyzes data representing a signal from a sensor 80. Generally, data representing a plurality of signals measured by sensors is received and analyzed. A trigger event may be associated with the data representing a signal of a specific sensor. For purposes of clarity, data representing a single signal from a sensor is described in detail.

At a block 330, if the data representing the signal includes or matches the trigger event 174 of the rule 170, the processor 100 generates a command signal based on the automated action 172 of the rule 170.

At a block 340, the processor 100 transmits the command signal to the vehicle system 70 that is associated with the automated action 172 and the vehicle system 70 performs the automated action.

FIG. 6 shows an automatic rule-creation method 400 according to an embodiment of the present disclosure. An automatic rule-creation application 120 includes computer-executable instructions that, when executed by the processor 100, cause the processor 100 to perform the automatic rule-creation method 400.

At a block 410, the processor 100 accesses data representing signals measured by sensors 80. For example, the data can be received and saved in the memory 110 and accessed from the memory 110 by the processor 100. In general, data representing a signal measured by a sensor that measures an input to a vehicle system using a control mechanism (referred to as a set of driver action data) is accessed. Also, data representing a signal measured by a sensor that measures any of the environment within and outside of the vehicle 20, the status or performance of vehicle systems 70, inputs to a vehicle system 70 using a control mechanism, and driver state (referred to generally as a set of sensor data) is accessed.

Figure 7:
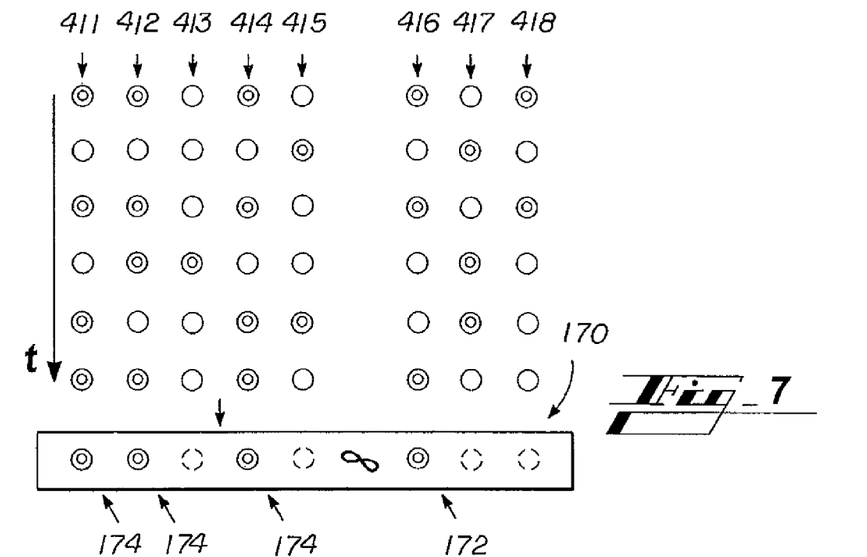
FIG. 7 illustrates an automatic rule creation application that, when executed by a processor, causes the processor to perform the automatic rule-creation method of FIG. 3.

Referring to FIG. 7, sets of sensor data 411, 412, 413, 414, 415 and sets of driver action data 416, 417, 418 at points in time t are illustrated. For simplicity, binary measurements are shown. A measurement is represented by either an empty circle or a filled-in circle. In certain embodiments, a value that is within a range is represented by a filled-in circle and a value that is outside the range is represented by an empty circle.

At a block 420, the processor 100 analyzes the sets of sensor data and the sets of driver action data. Particularly, the processor 100 identifies correlations between the sets of sensor data and the sets of driver action data, for example, at times t where a certain driver action (input to a vehicle system using a control mechanism) is repeated. The correlation can be determined deterministically or stochastically.

For example, methods to determine a correlation include identifying repeated sets (e.g., repeated combinations of data points in certain sets of sensor data and certain sets of driver action data). The correlation may be determined within a fixed time frame (e.g., x and then y within a space of 2 mins.); or with a fixed time gap between them (e.g., x and then two seconds later y). Other methods to determine a correlation include identifying that values of a data points in a set of sensor data fall within a certain range of values at times when a data points of a set of driver action data have a certain value (e.g., when outside temperature is between fifty six and sixty four degrees, air conditioning (AC) is turned on). In FIG. 7, certain values of data points of sets of sensor data 411, 412, 414 are correlated with certain values of data points of set of driver action data 416 as the combinations of values are repeated at different times t. Also, certain values of the sets of driver action data 417, 418 are correlated with one another as a certain value of the set of driver action data 417 follows a certain value of the set of driver action data 418.

At a block 430, when there is a correlation between sensor data and driver action data, the processor 100 automatically generates a rule 170 or displays the correlation to the user along with elements that allow the user to save the correlation as a rule or discard the correlation. In FIG. 7, the rule 170 generated from a correlation includes an action 172 based on the value of the set of driver action data 416 and a trigger event 174 based on the values of the sets of sensor data 411, 412, 414.

The automatic rule-creation application 120 can also automatically generate a rule 170 based on discovered correlations where signals used in the correlation are similar to other signals. For example, if signals a, b, c are registered as conenditional signals for an action z and if signals a, b, c are similar to d, f, g (e.g., a to d; b to f; c to g) then the automatic rule-creation application 120 may propose that d, f, g also be registered as conditional signals for an action z. Similarity between signals can be determined by characteristics' proximity (e.g., nearest neighbor). Similarity between actions may also be detected (e.g., if an action z is similar to an action y). In such a case, the system can suggest that event y be conditioned on the signals a, b, c that have been detected as relevant for event z.

The remote server 50 stores a database of rules through which a user can browse. The rules can be added to a user's profile 160 and edited. A user can also add rules to the database from the user's profile 160.

Figure 8:
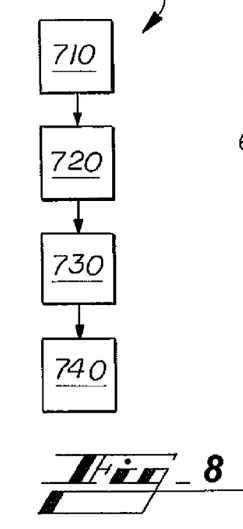
FIG. 8 illustrates a method of sharing a rule between profiles, according to an embodiment of the present disclosure.

FIG. 8 shows a sharing method 700 according to an embodiment of the present disclosure. A network application 120 includes computer-executable instructions that, when executed by the processor 100, cause the processor 100 to perform the sharing method 700. For example, the network application 120 is a web application that is stored on the remote server 50.

At a block 710, the network application 120 displays an interface through which a user can enter data to create a profile 160. For example, the data includes rules 170 associated with a vehicle 20. The profile 160 is saved to the remote server 50.

Figure 9:
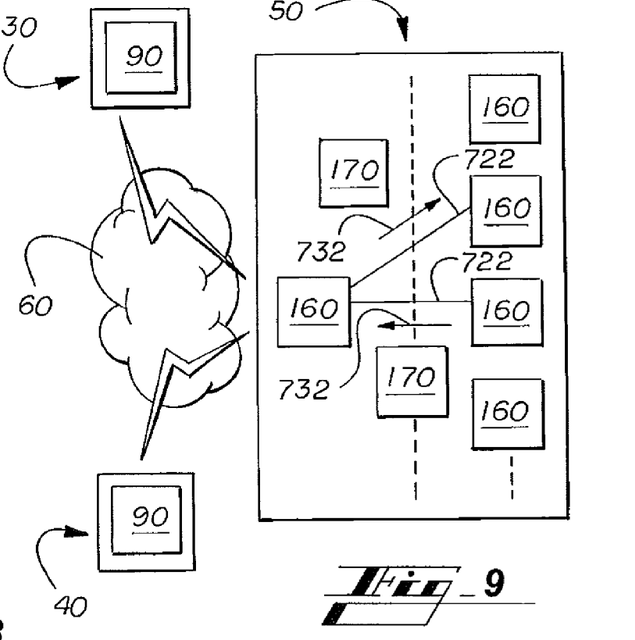
FIG. 9 illustrates a network application that, when executed by a processor, causes the processor to perform the sharing method of FIG. 8.

At a block 720, the network application 120 displays an interface through which a user can directly connect the user's profile 160 to other user profiles 160. For example, a user can find other user profiles 160 with which to connect through a search function, using open application programming interfaces with other social network accounts or email accounts, and the like. To create a connection between user profiles 160, a first user sends a request to a second user and, if the second user accepts the request, a connection is created between the profiles 160. Referring to FIG. 9, connections 722 between profiles 160 are schematically illustrated.

Once connected with another user's profile 160, at a block 730, the network application 120 is configured to display the other user's profile including the rules 170 (e.g., using the on-board device 30 or the auxiliary device 40). The network application 120 is configured to receive input from a user to add rules of another user's profile to the user's profile. Referring to FIG. 9, arrows 732 illustrate the addition of rules 170 from one profile 160 to another. Once a profile 160 is edited (e.g., addition of a rule from another profile), the latest version of the profile 160 is synced with the master profile.

At a block 740, the network application 120 suggests rules based on connections to other profiles and other profiles that are like a user.

Various embodiments of the present disclosure are disclosed herein. The disclosed embodiments are merely examples that may be embodied in various and alternative forms, and combinations thereof. As used herein, for example, "exemplary," and similar terms, refer expansively to embodiments that serve as an illustration, specimen, model or pattern.

The law does not require and it is economically prohibitive to illustrate and teach every possible embodiment of the present claims. Hence, the above-described embodiments are merely exemplary illustrations of implementations set forth for a clear understanding of the principles of the disclosure.

Variations, modifications, and combinations may be made to the above-described embodiments without departing from the scope of the claims. All such variations, modifications, and combinations are included herein by the scope of this disclosure and the following claims.

What is claimed is:

1. A method, comprising:
    analyzing, by a computing system having a processor, first signal data representing output of a first sensor of a vehicle that measures a manual control input by way of a control mechanism to a first vehicle system;
    analyzing, by the computing system, second signal data representing output of a second sensor of the vehicle;
    identifying, by the computing system, a correlation between the first signal data and the second signal data;
    generating, by the computing system, in response to identifying the correlation, a rule that includes an automated action and a trigger event, wherein the trigger event is based on one of the first signal data and the second signal data, and the automated action is based on another of the first signal data and the second signal data;
    accessing, by the computing system, additional signal data representing output of one of the first sensor and the second sensor of the vehicle; and
    generating, by the computing system, if the additional signal data includes the trigger event, a command signal that is based on the automated action and that is configured to control the first vehicle system.

2. The method of claim 1, wherein the first vehicle system includes an auxiliary device.

3. The method of claim 1, wherein the second sensor of the vehicle measures a manual control input by way of a control mechanism to a second vehicle system.

4. The method of claim 1, wherein the second sensor of the vehicle measures one of:
    an environmental parameter within the vehicle;
    an environmental parameter outside the vehicle;
    a performance of a second vehicle system; and
    a driver state.

5. The method of claim 1, comprising:
    initiating, by the computing system, displaying a rule indicator based on the rule generated; and
    initiating, by the computing system, displaying a selection element that is configured to receive user input to add the rule, based on the rule indicator, to a profile.

6. The method of claim 1, comprising generating, by the computing system, and initiating displaying of, an interface through which a user can directly connect a profile of the user to a profile of another user.

7. The method of claim 1, comprising accessing a database of rules, by the computing system, and initiating displaying of an interface through which a user can add a rule to a profile of the user.

8. The method of claim 1, wherein analyzing, by the computing system, the first signal data representing output of a first sensor of the vehicle that measures a manual control input to the first vehicle system by a control mechanism comprises determining times when a manual control input is repeated.

9. The method of claim 1, wherein identifying the correlation comprises identifying repeated combinations of data points, each combination of data points including a first data point in the first signal data and a second data point in the second signal data.

10. The method of claim 1, wherein identifying the correlation comprises identifying a correlation between a first data point in the first signal data and a second data point in the second signal data, wherein the correlation is identified:
    within a fixed time frame; or
    with a fixed time gap between the first data point and the second data point.

11. The method of claim 1, wherein identifying the correlation comprises identifying that a second data point in the second signal data falls within a certain range of values at a time when a first data point in the first signal data has a certain value.

12. The method of claim 1, wherein the manual control input includes an input to a control inside the vehicle.

13. The method of claim 12, wherein the manual control input is by hand or by voice.

14. The method of claim 1, wherein accessing, by the computing system using a processor, additional signal data representing output of one of the first sensor and the second sensor of the vehicle is accessing an additional output of the first sensor.

15. The method of claim 1, wherein accessing, by the computing system using a processor, additional signal data representing output of one of the first sensor and the second sensor of the vehicle is accessing an additional output of the second sensor.

16. A vehicle, comprising:
    a first vehicle system and a second vehicle system;
    a first sensor that measures a manual control input to the first vehicle system;
    a second sensor that measures one of:
        a manual control input to the second vehicle system;
        an environmental parameter within the vehicle;
        an environmental parameter outside the vehicle;
        a performance of the second vehicle system; and
        a driver state; and
    a processor; and
    a memory comprising computer readable instructions that, when executed by the processor, cause the processor to perform operations comprising:
        analyzing first signal data representing output of the first sensor;
        analyzing second signal data representing output of the second sensor;
        identifying a correlation between the first signal data and the second signal data;
        generating, in response to identifying the correlation, a rule that includes an automated action and a trigger event, wherein the trigger event is based on one of the first signal data and the second signal data, and the automated action is based on another of the first signal data and the second signal data;

accessing additional signal data representing output of one of the first sensor and the second sensor; and generating, if the additional signal data includes the trigger event, a command signal that is based on the automated action and that is configured to control one of the first vehicle system and the second vehicle system.

17. The vehicle of claim 16, wherein analyzing the first signal data representing output of the first sensor comprises determining times when a manual control input is repeated.

18. The vehicle of claim 16, wherein identifying a correlation comprises one of:

identifying repeated combinations of data points, each combination of data points including a first data point in the first signal data and a second data point in the second signal data;

identifying a correlation between a first data point in the first signal data and a second data point in the second signal data, wherein the correlation is identified within a fixed time frame or with a fixed time gap between the first data point and the second data point; and identifying that a second data point in the second signal data falls within a certain range of values at a time when a first data point in the first signal data has a certain value.

19. The vehicle of claim 16, wherein a manual control input includes an input to a control inside the vehicle.

20. The vehicle of claim 19, wherein the manual control input is by hand or by voice.

* * * * *